United States Patent
Fuerschbach et al.

(10) Patent No.: US 6,300,591 B1
(45) Date of Patent: Oct. 9, 2001

(54) METHOD FOR LASER WELDING A FIN AND A TUBE

(75) Inventors: Phillip W. Fuerschbach, Tijeras; A. Roderick Mahoney, Albuquerque; John O Milewski, Santa Fe, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/535,070

(22) Filed: Mar. 23, 2000

(51) Int. Cl.$^7$ .................................................. B23K 26/00
(52) U.S. Cl. ...................................... 219/121.64; 228/183
(58) Field of Search .......................... 219/121.63, 121.64, 219/121.85; 228/183

(56) References Cited

U.S. PATENT DOCUMENTS

| | | | |
|---|---|---|---|
| 3,397,440 | * 8/1968 | Dalin | 29/890.048 |
| 3,999,029 | 12/1976 | Orr, Jr. | 219/107 |
| 4,362,921 | 12/1982 | Rudd | 219/61 |
| 4,737,612 | * 4/1988 | Bruck et al. | 219/121.64 |
| 4,784,312 | * 11/1988 | Gotoh | 228/157 |
| 4,913,337 | * 4/1990 | Gotoh | 228/173.6 |
| 4,969,255 | * 11/1990 | Schmidt et al. | 29/726 |
| 5,760,365 | 6/1998 | Milewski et al. | 219/121.64 |

OTHER PUBLICATIONS

Metals Handbook Ninth Edition, vol. 6, "Laser Beam Welding", pp. 647–671, copyright 1983.*

* cited by examiner

*Primary Examiner*—Samuel M. Heinrich
(74) *Attorney, Agent, or Firm*—Elmer A. Klavetter

(57) ABSTRACT

A method of laser welding a planar metal surface to a cylindrical metal surface is provided, first placing a planar metal surface into approximate contact with a cylindrical metal surface to form a juncture area to be welded, the planar metal surface and cylindrical metal surface thereby forming an acute angle of contact. A laser beam, produced, for example, by a Nd:YAG pulsed laser, is focused through the acute angle of contact at the juncture area to be welded, with the laser beam heating the juncture area to a welding temperature to cause welding to occur between the planar metal surface and the cylindrical metal surface. Both the planar metal surface and cylindrical metal surface are made from a reflective metal, including copper, copper alloys, stainless steel alloys, aluminum, and aluminum alloys.

12 Claims, 1 Drawing Sheet

METHOD FOR LASER WELDING A FIN AND A TUBE

This invention was made with Government support under Contract No. DEAC04-94AL85000 awarded by the Department of Energy. The Government has certain rights in the invention.

BACKGROUND OF THE INVENTION

The invention relates generally to a method for laser welding and more particularly for the laser welding of highly reflective fins and tubes.

Laser welding is a widely applied method for both high-volume and small-batch welding of many different metal products. Due to the small beam spotsize, laser welding is also an ideal process for thin-section metal welding and sheet metal applications where the extent of the heat-affected zone must be minimal. These attributes are both also especially important for the joining of fin and tube solar collectors. Unfortunately, the general use of copper or aluminum in solar collectors presents difficulties in utilizing laser welding because the laser beam is easily reflected from the weld pool surface. The reflectivity of copper to 10.6 $\mu$m light is on the order of 99% and production applications involving laser welding of copper and copper alloys are quite rare. When welding materials with high reflectivity, such as aluminum and copper alloys, it is difficult to obtain the depth of penetration achieved with materials such as steel and nickel alloys. While successful laser welds can be made on reflective metals, the process is not robust and can produce defective welds and damage the laser or even the laser operator. Problems such as variable weld penetration, difficulty in bridging gaps, non-uniform weld-bead appearance, spatter, burn-though, and general poor weld quality are often traced to inconsistent laser beam absorption at the workpiece.

The most consistent laser welds, especially on reflective materials, are obtained when a deep, laser-created, metal-vapor-supported cavity is formed in the metal workpiece. The cavity traps the incident laser beam due to multiple internal reflections within. This mechanism, known as the Mendenhall wedge effect, relies on Fresnel absorption where a specific fraction of the beam energy is deposited at each reflecting surface. For shallow depth welds where a deep cavity cannot be formed, specially prepared weld joints must be fabricated to promote multiple reflections to assure consistent absorption.

Achieving desired joint fusion such as where a thin fin joins a relatively thicker wall tube in a solar collector, is difficult and often relies on special joint design and use of multiple weld passes. Rudd (U.S. Pat. No. 4,362,921) describes a method of welding a planar solar panel element to a tube using highfrequency, electric currents wherein the tubing is formed with a pair of abutting lips to facilitate the welding process. Orr (U.S. Pat. No. 3,999,029) also describes a process of welding a fin to a tube using high-frequency electrical resistance heating, facilitating the welding by first deforming the tube.

High energy density welding methods such as electron beam welding and laser welding have been used with consistent energy absorption by achieving high depth-to-width aspect ratio welds. These methods generally utilize keyhole melting and do not require joint preparation and back fill. However, when these methods are used for higher aspect ratio welds, there are increased chances for cold shut voids, root porosity, other root defects and missed joints. Milewski et al. (U.S. Pat. No., 5,760,365) describe a method to overcome problems associated with high depth-to-width aspect ratio welds wherein the weld joint is considered as an optical element and an optical ray tracing technique is used to model a laser beam and join geometry of a weld, calibrating a model through an iterative technique to optimize selection of laser welding parameters to achieve the desired weld. The method provides a complex modeling technique to optimize welding parameters.

SUMMARY OF THE INVENTION

According to the method of the present invention, a method of laser welding a planar metal surface to a cylindrical metal surface is provided, first placing a planar metal surface into approximate contact with a cylindrical metal surface to form a juncture area to be welded, the planar metal surface and cylindrical metal surface thereby forming an acute angle of contact. A laser beam is focused through the acute angle of contact at the juncture area to be welded, with the laser beam heating the juncture area to a welding temperature to cause welding to occur between the planar metal surface and the cylindrical metal surface. Both the planar metal surface and cylindrical metal surface are made from a reflective metal, including copper, copper alloys, stainless steel alloys, mild steel, aluminum, and aluminum alloys.

In one embodiment of the method of the present invention, the acute angle of contact is less than approximately 45°.

In another embodiment, the laser beam is produced from a pulsed Nd:YAG laser, with a pulse frequency of between approximately 10 and approximately 200 Hz, a pulse duration of approximately 0.5 to approximately 10 milliseconds, a focal length of approximately 100 millimeters, an average power of greater than approximately 150 watts, and a travel speed of greater than 10 mm/sec.

DETAILED DESCRIPTION OF THE INVENTION

Figure 1:
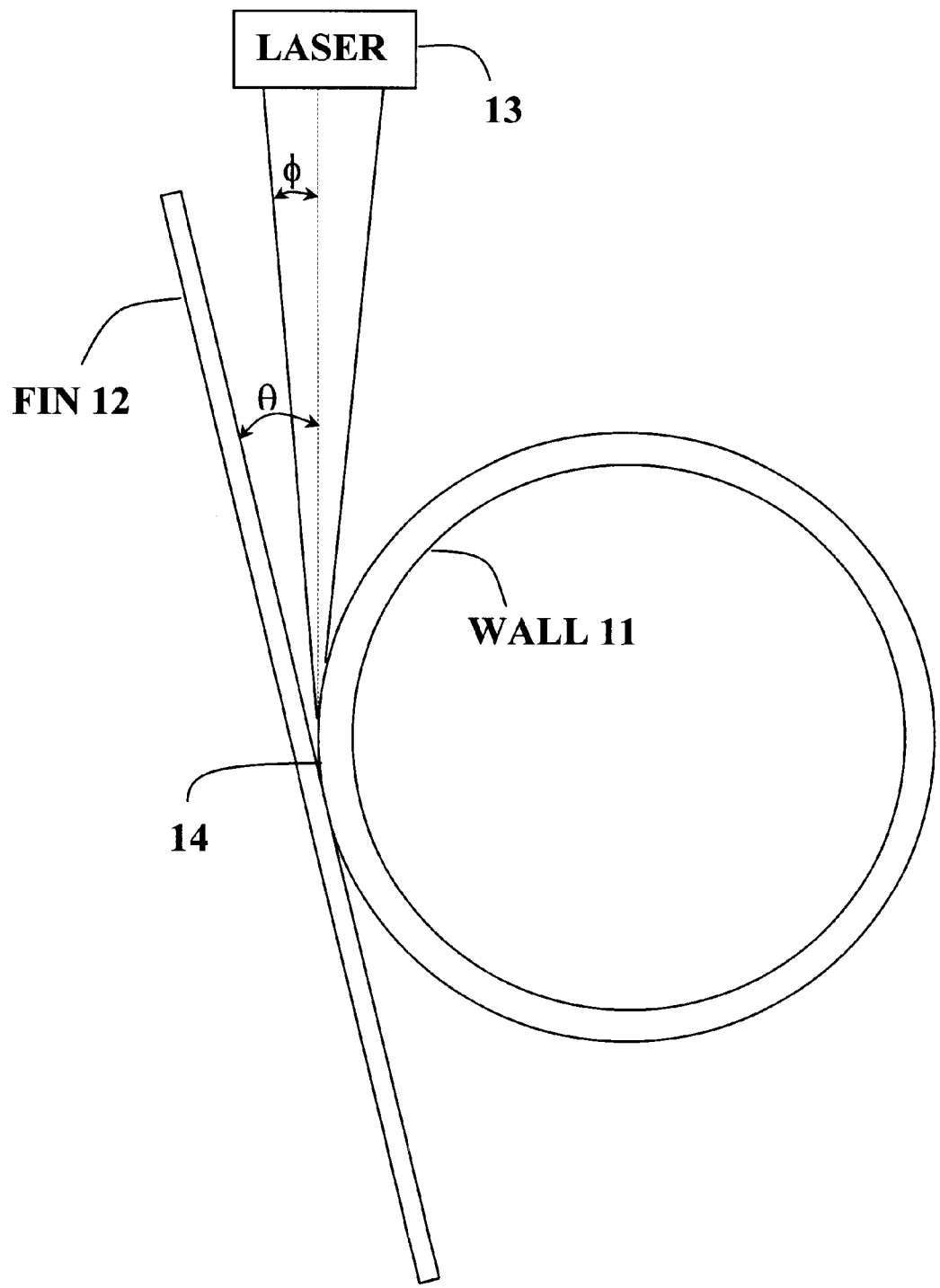
FIG. 1 shows an illustration of the fin and tube laser welding geometry.

The tangent point of where a fin and tube are joined, such as in a solar collector, provides a natural Mendenhall wedge cavity that can be used to trap the incident laser beam and to assure weld consistency. The method of the present invention provides laser welding of a planar metal surface, such as a fin, and a cylindrical metal surface, such as a tube, by focusing the laser beam down inside the wedge-shaped cavity through the acute angle where a fin and tube meet. In essence, this involves welding in an upside down technique. The method of the present invention differs from prior work where the beam is focused onto the surface of the planar fin opposite the juncture point of the fin and tube wall. Wherein previous methods heated the outer surface of the fin and relied on conductivity through the fin to heat both the fin and tube wall to a temperature at which a weld would occur, the previous method advantageously heats both the fin and tube wall simultaneously without relying only on conduction through one of the metal components. The method of the present invention also differs from prior work in that the upside-down technique allows jointing of the fin-tube with minimal visual damage to the absorber coating on the top side of the fin.

FIG. 1 shows an illustration of a fin contacting a tube and the location where a weld is desired. The figure shows the cylindrical wall 11 of the tube contacting the planar fin 12, wherein the orientation angle θ is less than 90°. The laser 13 is oriented to focus the laser beam into the acute-angle cavity at approximately the juncture 14 between the tube wall 11 and the fin 12. The laser beam can be focused from either side of the juncture point. The weld occurs at approximately this junction point.

In the method of the present invention, the orientation angle θ is an acute angle. From practical considerations to take advantage of the Mendenhall wedge effect, the orientation angle should generally be approximately 45° or less. Reflective metals that can be used to take advantage of this wedge effect include stainless steel, aluminum, and copper. In the method of the present invention, the angular orientation of the fin with respect to the tube should be made as small as practical to enhance the wedge effect. The minimum angle that can be used will be limited by the incident laser beam spatial geometry. To facilitate alignment and to prevent the focused laser beam from contacting the fin well above the fin-tube tangent pint, the orientation angle θ should be greater than the cone angle of the incident beam, φ (see FIG. 1).

The cone angle of the focused laser beam is a function of the lens focal length, the diameter of the beam entering the lens, and the laser beam quality. The laser beam quality and the diameter of the beam are in general dependent upon the particular laser used. Therefore, the cone angle to be used is set by the choice of optic focal length. Lasers that can be utilized include continuous wave and pulsed lasers, solid state lasers such as a Nd:YAG laser, gas lasers such as $CO_2$ lasers, and semiconductor lasers such as diode lasers.

In one embodiment, a 100 mm focal length was used because it yields a relatively small focus spotsize and small cone angle. Because spotsize and cone angle are inversely proportional, a longer focal length lens yields a smaller cone angle but the spotsize would increase and the focused beam can strike the fin further above the tangent point. Using a 100-mm focal length and an orientation angle of 13°, a good weld was achieved with a pulsed Nd:YAG laser using argon gas shielding, a travel speed of approximately 15.2 mm/sec for the weld, a pulse frequency between approximately 20–30 Hz, a pulse duration of approximately 1–3 msec and an average power of between approximately 150 and 260 W. Travel speeds with the pulsed Nd:YAG laser utilized can be speeds greater than approximately 10 mm/sec; pulse frequencies of between approximately 10 to 200 Hz can be used; and pulse durations of approximately 0.5 to approximately 10 milliseconds can be used.

In another embodiment, a six-foot long copper cylindrical tube was welded to a copper fin using the method of the present invention. In this embodiment, a 150-mm focal length was used with a laser average power value of between 100 and 150 watts.

In contrast, in another embodiment, fin burn-through occurred when an orientation of only 45° was used, also with a focal length of 100 mm, argon gas shielding, a travel speed of approximately 12.7 mm/sec, a pulse frequency of 10 Hz, a pulse duration of 2 msec, and an average power of 170 W. For these particular conditions when using a Nd:YAG laser, an orientation angle of greater than 45° must be utilized to achieve a good weld.

The planar fin is tightly clamped to obtain intimate contact with the tube at the desired juncture for welding. The laser imparts energy to the contact juncture of the two metal components through the acute angle formed by the contact at an orientation angle less than approximately 45°, heating the metal of both the fin and the tube to welding temperature in the juncture area where the two components contact. Both overlapping and non-overlapping weld pools can be formed. It is not necessary to determine if the focused laser beam is either converging or diverging because the wedge effect prevents the majority of the energy from the laser beam from being reflected out.

Welding is achieved during heating of the juncture area between the tubing and the planar fin by relative movement between the laser beam and the planar metal surface and cylindrical metal surface in a direction longitudinal to the cylindrical metal surface. In such a mode, a continuous or pulsed laser can be used, depending on the nature of the weld desired.

We claim:

1. A method of laser welding a planar metal surface to a cylindrical metal surface, comprising:

placing a planar metal surface into approximate contact with a cylindrical metal surface to form a juncture area to be welded, said planar metal surface and said cylindrical metal surface thereby forming an acute angle of contact, wherein said planar metal surface is made from a reflective metal selected from copper, copper alloys, aluminum and aluminum alloys and said cylindrical metal surface is made from a reflective metal selected from copper, copper alloys, aluminum and aluminum alloys; and focusing a laser beam through the acute angle of contact at the juncture area to be welded, said laser beam heating the juncture area to a welding temperature thereby causing welding to occur between said planar metal surface and said cylindrical metal surface.

2. The method of claim 1 wherein the acute angle of contact is less than approximately 45°.

3. The method of claim 1 wherein the laser beam is produced from a pulsed Nd:YAG laser.

4. The method of claim 3 wherein the Nd:YAG laser has a pulse frequency of between approximately 10 and approximately 200 Hz.

5. The method of claim 3 wherein the Nd:YAG laser has a pulse duration of approximately 0.5 to approximately 10 milliseconds.

6. The method of claim 3 wherein the Nd:YAG laser has a focal length of between approximately 50 and approximately 200 millimeters.

7. The method of claim 3 wherein the Nd:YAG laser has an average power of great than approximately 100 watts.

8. The method of claim 3 wherein the Nd:YAG laser has a travel speed of greater than 10 mm/sec.

9. The method of claim 1 further comprising the step of producing relative movement between the laser beam and the planar metal surface and cylindrical metal surface in a direction longitudinally of the cylindrical metal surface and during heating of the juncture area to produce a substantially continuous weld.

10. The method of claim 1 wherein the planar metal surface is a fin and the cylindrical metal surface is a tube, said fin and said tube being part of a solar collector.

11. A method of laser welding a solar collector fin to a tube, comprising:

placing a metal fin, said metal fin made from a metal selected from a group consisting of aluminum and copper, into approximate contact with a metal tube, said metal tube selected from a group consisting of aluminum and copper, to form a juncture area to be welded, said metal fin and metal tube thereby forming an acute angle of contact; and focusing a laser beam through the acute angle of contact at the juncture area to be welded, said laser beam heating the juncture area to a welding temperature thereby causing welding to occur between said metal fin and metal tube.

12. The method of claim 11 wherein said laser beam is produced from a pulsed Nd:YAG laser.

* * * * *